(No Model.)
C. MILLER.
HORSESHOE.
No. 388,213. Patented Aug. 21, 1888.
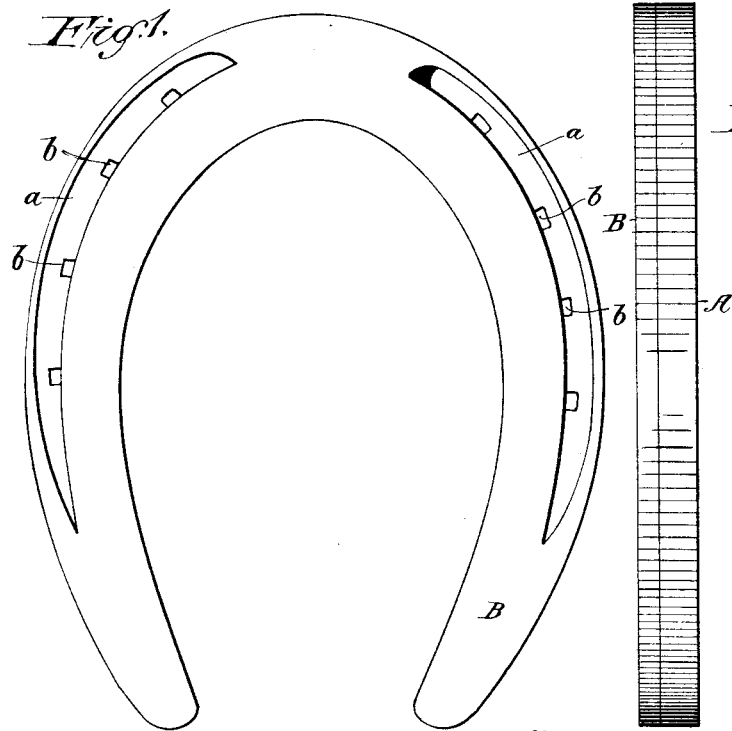
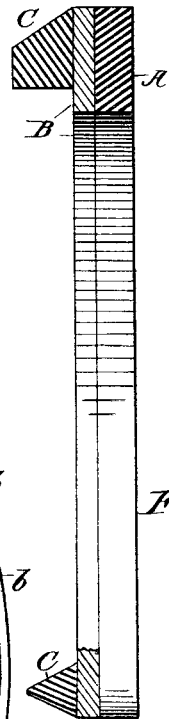
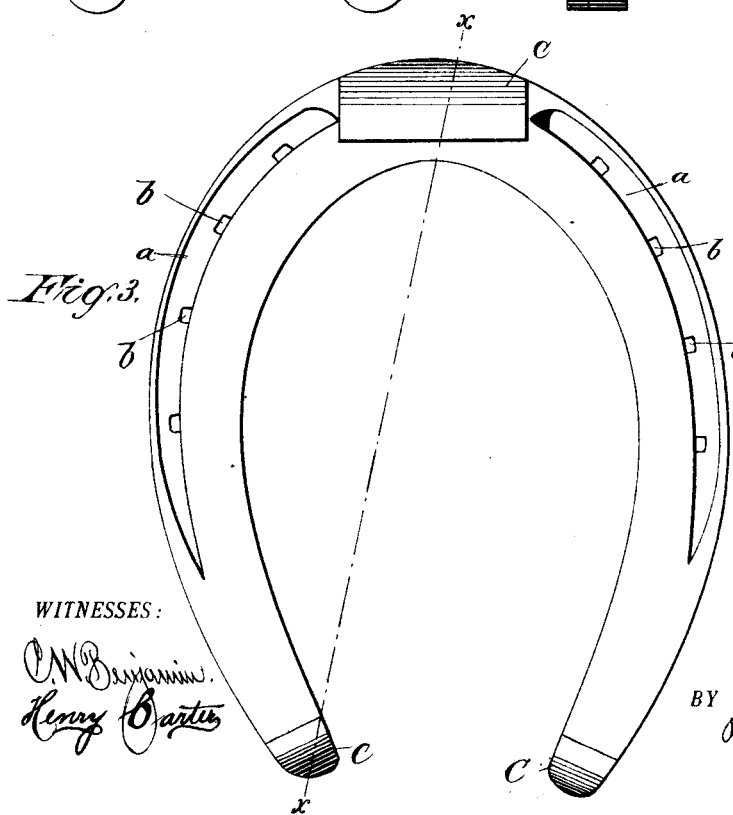
WITNESSES:
C. W. Benjamin
Henry Carter
INVENTOR,
Charles Miller.
BY
Wm. H. Appleton
ATTORNEY.

UNITED STATES PATENT OFFICE.

CHARLES MILLER, OF NEW YORK, N. Y.

HORSESHOE.

SPECIFICATION forming part of Letters Patent No. 388,213, dated August 21, 1888.

Application filed January 18, 1888. Serial No. 261,104. (No model.)

*To all whom it may concern:*

Be it known that I, CHARLES MILLER, a citizen of the United States, and a resident of the city, county, and State of New York, have invented certain new and useful Improvements in Horseshoes, of which the following is a specification.

My invention has reference to that class of horseshoes, which, with their calks, are made entirely of steel, and has for its object to produce a shoe of this class which, while possessing all of the advantages of a shoe made entirely from that material, shall at the same time permit of the more ready welding of the calks thereto, when desired, than has been possible with such shoes as heretofore in use.

In the manufacture of steel horseshoes as hitherto made great difficulty has been experienced in welding the calks thereto, principally because of the fact that when the parts were heated to the proper degree to permit of the accomplishment of such result the material becomes so brittle as to crumble under the blows of the hammer or other pressure applied to it, and as a consequence thereof a homogeneous and perfect weld or joint was not possible therewith.

I have discovered that by interposing between the calks and the shoe at the points where the former are joined to the latter a thin strip of wrought-iron with which the steel will readily unite the objection above pointed out may be obviated and a perfect and expeditious weld between the parts readily effected.

My invention therefore consists, first, in a horseshoe-blank made from steel with a thin strip of wrought-iron welded to its under side; and, second, in a horseshoe constructed of steel with a thin strip of wrought-iron welded to its under side, and with a steel calk or calks welded to the under side of said strip, all as will hereinafter more fully appear.

Referring to the accompanying drawings, in which my invention is represented, Figure 1 is an under side view of a horseshoe-blank constructed in accordance with my invention; Fig. 2, an edge view thereof; Fig. 3, a view similar to Fig. 1, showing a completed shoe with the heel and toe calks welded thereto; and Fig. 4, a section taken on the line $x\ x$ of Fig. 3.

In all the figures, A indicates a strip of steel, and B a strip of wrought-iron welded to its under side, the two strips together forming the body of the shoe, which is properly fashioned by any of the well-known methods and is provided with the usual creases or grooves, $a$, in its under side, and also with the nail-holes $b$. The strip A is made sufficiently thick to insure the necessary stiffness and strength to the shoe without the assistance of the strip B, which, as before indicated, is employed merely as a means for permitting of the welding of the calks to the shoe, and may be applied only at the points where they are secured or be extended the length of the shoe and cover its entire bottom. This last-mentioned construction I prefer in practice, as the cost of manufacture is thereby cheapened, since the composite bar, out of which the shoe is made, may be produced in the rolling-mills and the parts thereof welded together during the rolling operation. The thickness of the wrought-iron strip may be varied as desired. I have found that a thickness of a thirty-second of an inch, however, is sufficient for most purposes, but the same may be increased if found necessary.

The calks are shown at C, the same being preferably made of steel of the shape required and welded to the under side of the wrought-iron strip B, as shown; or, if preferred, the toe-calk only may be made of a separate piece and welded to the shoe, the heel-calks being formed by bending down the ends of the latter and sharpening or fashioning them into proper form.

By this construction, as will be seen, I produce a horseshoe which possesses all the advantages of a shoe made entirely of steel, and which at the same time permits of the ready welding of steel calks thereto whenever the same may be found necessary or desirable.

I am aware that horseshoes made from a composite bar having for its components a steel strip interposed between two wrought-iron strips and the several strips welded together is not new, as is also a shoe made from a bar in which a diamond-shaped steel strip has been inclosed wholly within wrought-iron. These I do not claim. My invention differs from these in having the entire shoe, with the exception of the thin wrought-iron strip employed to aid in welding the calks thereto, made from steel.

Having thus described my invention, what I claim as new, and desire to secure by Letters Patent of the United States, is—

1. A blank for horseshoes, consisting of a steel strip bent into proper form with a thin strip of wrought-iron welded to its under side, substantially as described.

2. A horseshoe having its body portion formed from steel with a thin strip of wrought-iron welded to its under side, and having calks welded to the under side of said strip, substantially as described.

3. A horseshoe having its body portion formed from steel with a thin strip of wrought-iron welded to its under side, and having steel calks welded to the under side of said strip, substantially as described.

In testimony whereof I have hereunto set my hand this 17th day of January, 1888.

CHARLES MILLER.

Witnesses:
H. W. FINLEY,
HENRY CARTERS.